(12) United States Patent
Mollhagen

(10) Patent No.: US 6,425,351 B1
(45) Date of Patent: Jul. 30, 2002

(54) PORTABLE SQUEEZE CHUTE APPARATUS

(76) Inventor: Jon D. Mollhagen, Rte. 1, Box 63, Lorraine, KS (US) 67459

( * ) Notice: Subject to any disclaimer, the term of this patent is extended or adjusted under 35 U.S.C. 154(b) by 0 days.

(21) Appl. No.: 09/534,804

(22) Filed: Mar. 24, 2000

(51) Int. Cl.⁷ .................................................. A01K 1/06
(52) U.S. Cl. ...................................................... 119/733
(58) Field of Search ................................ 119/729, 732, 119/733, 737

(56) References Cited

U.S. PATENT DOCUMENTS

| | | | |
|---|---|---|---|
| 629,675 A | | 7/1899 | Fox |
| 2,139,710 A | * | 12/1938 | Yokum ........................ 119/733 |
| 2,279,840 A | | 4/1942 | Robinson |
| 2,483,516 A | | 10/1949 | Babson |
| 2,510,703 A | * | 6/1950 | Linton ........................ 119/733 |
| 2,593,597 A | | 4/1952 | Palmer |
| 2,678,631 A | * | 5/1954 | Hagar ........................ 119/737 |
| 2,692,577 A | | 10/1954 | Thomas |
| 2,713,326 A | | 7/1955 | Stephenson |
| 2,714,367 A | | 8/1955 | Arnold |
| 2,786,449 A | | 3/1957 | Dahlerup |
| 2,935,965 A | | 5/1960 | Smith |
| 2,991,755 A | | 7/1961 | Ekren et al. |
| 2,995,111 A | | 8/1961 | Darden |
| 3,051,127 A | | 8/1962 | Norbury |
| 3,099,249 A | | 7/1963 | Newhouse, Jr. |
| 3,225,744 A | | 12/1965 | Procter |
| 3,237,603 A | | 3/1966 | Markegard |
| 3,370,835 A | | 2/1968 | Crowson |
| 3,631,839 A | | 1/1972 | Pascual |
| 3,683,864 A | | 8/1972 | Priefert |
| 3,796,191 A | | 3/1974 | McIntire |
| 3,894,515 A | | 7/1975 | Plyler |
| 3,929,104 A | | 12/1975 | Corbin |
| 4,027,629 A | | 6/1977 | Pearson |
| 4,034,716 A | | 7/1977 | Fleming |
| 4,201,157 A | | 5/1980 | Lambert |
| 4,201,158 A | | 5/1980 | Parker |
| 4,250,836 A | | 2/1981 | Smith |
| 4,302,908 A | | 12/1981 | Parker |
| 4,303,258 A | | 12/1981 | Davis |
| 4,321,889 A | | 3/1982 | Michaelsen et al. |
| 4,366,775 A | | 1/1983 | Tyquin |
| 4,432,305 A | | 2/1984 | Vernese |
| 4,452,178 A | | 6/1984 | Nijhuis |
| 4,499,856 A | | 2/1985 | Hecht et al. |
| 4,513,691 A | | 4/1985 | Wood |
| 4,566,404 A | | 1/1986 | Instone et al. |
| 4,617,876 A | | 10/1986 | Hayes |
| 4,630,570 A | | 12/1986 | Wilson et al. |
| 4,702,200 A | | 10/1987 | Simington |
| 4,829,936 A | | 5/1989 | Mollhagen |
| 4,947,800 A | | 8/1990 | Widney |
| 4,960,074 A | | 10/1990 | Wilson |
| 5,111,773 A | | 5/1992 | Akins |
| 5,138,981 A | | 8/1992 | Akins |
| 5,184,572 A | | 2/1993 | Meir |
| 5,331,923 A | | 7/1994 | Mollhagen |

* cited by examiner

*Primary Examiner*—Robert P. Swiatek
(74) *Attorney, Agent, or Firm*—Shugart Thomson & Kilroy, P.C.

(57) ABSTRACT

A portable squeeze chute apparatus. The apparatus includes a chute having opposing sidewalls, an entrance end and an exit end. The sidewalls are selectively pivotable toward one another in order to inhibit lateral movement of an animal positioned in the chute. Movement of the sidewalls is actuated through a control chain which is connected to the sidewalls through a mechanical linkage. The control chain is selectively latched in position by a lock which is pivotally connected to the chute. The lock includes a tubular body through which the control chain passes. The tubular body includes a notch which selectively engages the control chain. A tailgate having interconnected door sections is mounted on the entrance end of the chute for selectively admitting an animal to the chute The tailgate and the sidewall squeezing mechanism include special mountings and bumpers which are adapted to reduce noise generated by operation of the apparatus.

31 Claims, 9 Drawing Sheets

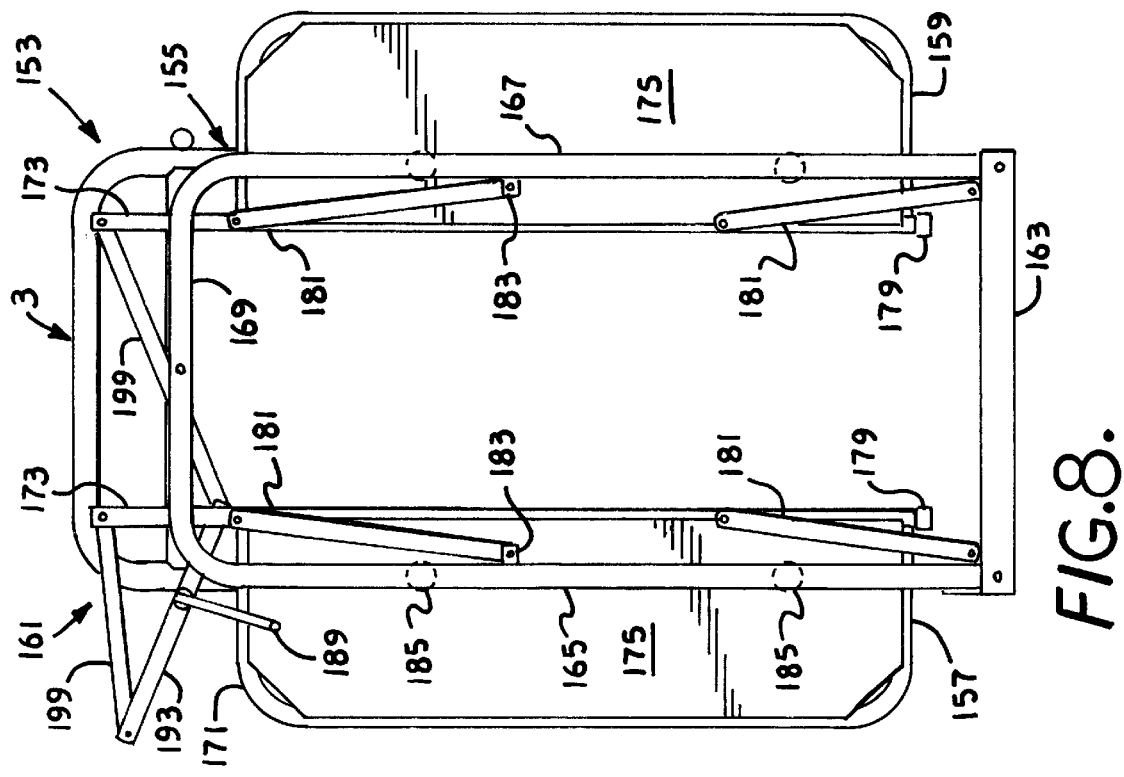
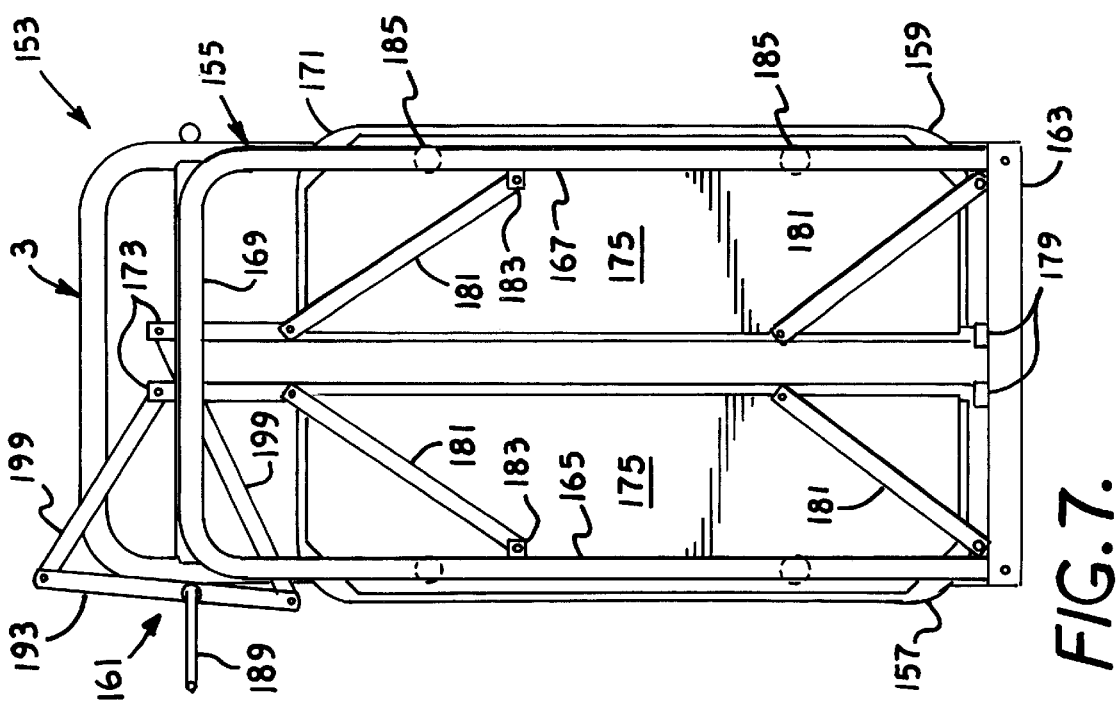

PORTABLE SQUEEZE CHUTE APPARATUS

BACKGROUND OF THE INVENTION

1. Field of the Invention

The present invention relates generally to animal husbandry, and in particular to a portable apparatus for use in connection with treating livestock.

2. Description of the Related Art

In livestock operations it is frequently necessary to vaccinate, palpate, artificially inseminate, brand, dehorn, or otherwise treat the animals. In order to perform these tasks, the animals must be restrained. Permanent corrals constructed of steel pipe, wood or stone and having alleyways with headgates for holding the animals have long been used for this purpose. The capital investment required for building such permanent structures is often prohibitive, however. This is especially true among ranchers with decentralized operations where livestock are run on relatively small, isolated tracts of grazing land. Furthermore, many ranchers lease, rather than own, their grazing land and naturally wish to avoid making permanent, fixed improvements.

A solution to this problem is to provide portable livestock working equipment. Temporary corrals may be readily constructed using prefabricated, portable steel panels. Portable livestock working facilities mounted on wheels, such as that described in my previous Letters Patent, U.S. Pat. No. 4,829,936, may also be used. Either of these systems, however, must be used in conjunction with a portable animal restraining device such as a "squeeze chute."

Squeeze chutes are well known and effective devices for restraining livestock while they are being treated. A squeeze chute combines a traditional "headgate," which features a neck clamping means for restraining an animal's fore-and-aft movement, with a sidewall squeezing means for restraining the lateral movement of animals of varying sizes. Such squeeze chutes are of unitary construction and may be transported from one working location to another using a truck or trailer, or they may be equipped with retractable wheels so that they may be towed.

One problem with squeeze chutes which have been used heretofore is that their operation tends to produce a lot of noise, which can range from relatively low-amplitude background noise to relatively loud impact noises. This noise is stressful to animals and operators alike. Even the relatively low-amplitude background noises or "chatter" can contribute to stress, fatigue and the like. The sudden, high amplitude noises, such a those that might occur when gates or drop panels are slammed shut, can startle the animals and significantly increase their anxiety. Moreover, as frightened animals tend to struggle, they can further contribute to the noise levels by shaking the entire chute and exacerbate the stress-related problems.

One reason squeeze chutes have tended to be so noisy is that livestock handling systems are typically constructed with a certain amount of play, or with relatively loose tolerances at their connections. Such tolerances tend to reduce manufacturing costs and also tend to make such units better adapted for operation under the types of adverse conditions which they are likely to encounter in the field.

My previous Letters Patent, U.S. Pat. No. 5,331,923, which is herein incorporated by reference, addressed this problem by disclosing a hydraulically operated squeeze chute with noise reducing sleeve bushings and O-rings in many of its key joints. These bushings and O-rings help reduce noise by preventing metal-to-metal contact between the various parts of the chute. While hydraulic squeeze chutes are ideal for use in high volume livestock operations such as those found at sale barns, feedlots, veterinary clinics, and large ranches, they can be prohibitively expensive for smaller livestock producers. In addition, hydraulic chutes can be heavy and difficult to transport.

What is needed is a manually operated squeeze chute apparatus which is quiet, easily portable, economical, and which still provides working accessability to an animal confined therein while assuring relative safety and comfort for both the animal being worked and those working the animal.

SUMMARY OF THE INVENTION

An improved portable squeeze chute apparatus is provided for restraining a large animal while being worked, such as branding, vaccinating, artificially inseminating, de-horning or the like. The apparatus includes a chute having opposing sidewalls, an entrance end, an exit end, a base having a floor, and a superstructure. The sidewalls are connected to the superstructure such that each of the sidewalls is rotatable about an axis provided by a pair of generally horizontally oriented stub axles situated near the lower extremity thereof Upper portions of the opposing sidewalls are interconnected such that they can be synchronously pivoted about their respective axes to selectively allow and prevent lateral movement of an animal positioned in the chute.

The synchronous pivoting of the opposing sidewalls is manually controlled by means of a chain connected to a pivoting control rod which is in turn connected to the sidewalls. A squeeze latch is provided to retain the opposing sidewalls in a desired position. The lower extremities of the opposing sidewalls are adjustable so as to allow the chute to be widened or narrowed to fit animals of varying sizes. Each of the opposing sidewalls has a lower panel which is pivotable about a lower extremity thereof to provide access to lower portions of an animal positioned in the chute. A lower panel latching mechanism selectively retains the lower panel in a closed configuration. The lower panels have planar inner surfaces to avoid providing footholds for an animal positioned in the chute. Each of the opposing sidewalls also has an upper panel which is pivotable about a lower extremity thereof to provide access to upper portions of an animal positioned in the chute. An upper panel latching mechanism selectively retains the upper panel in a closed configuration. The upper panels generally comprise a plurality of vertically oriented, spaced apart bars such that persons working on an animal positioned in the chute can stand outside and reach therebetween. One or both of the opposing sidewalls may be fitted with side exit gates which pivot about a rear extremity of the sidewall and latch at a front extremity. Such side gates are useful for sorting animals or for releasing animals which may become entrapped in the chute.

The improved portable squeeze chute apparatus also includes an tailgate which is connected to the entrance end of the chute and adapted to selectively admit an animal to the chute and prevent the animal from exiting rearwardly from the chute one so admitted. The tailgate has a pair of cooperating opposing door sections which are interconnected such that they move transversely to the chute between open and closed positions. The tailgate door sections are connected to the chute by a parallelogram linkage and generally open upwardly and outwardly from the chute. Opening and closing of the tailgate door sections is manually controlled by manipulating a handle connected to pivoting control rod which is in turn connected to the door sections. The exit end of the chute provides a mounting place for a headgate with a neck clamp for restraining the fore and aft movement of an animal positioned in the chute. The present invention does not include such a headgate, but headgates are commercially available from many sources. Noise reducing bushings, O-rings, and bumpers are provided between a plurality of the moving parts to minimize noise fatigue of the user and to prevent unnecessarily agitating the animals.

BRIEF DESCRIPTION OF THE DRAWINGS

FIG. 7 is a partial, rear view of the portable squeeze chute showing the tailgate assembly in the closed position.

FIG. 8 is a partial, rear view of the portable squeeze chute showing the tailgate assembly in the open position.

DETAILED DESCRIPTION OF THE INVENTION

Figure 1:
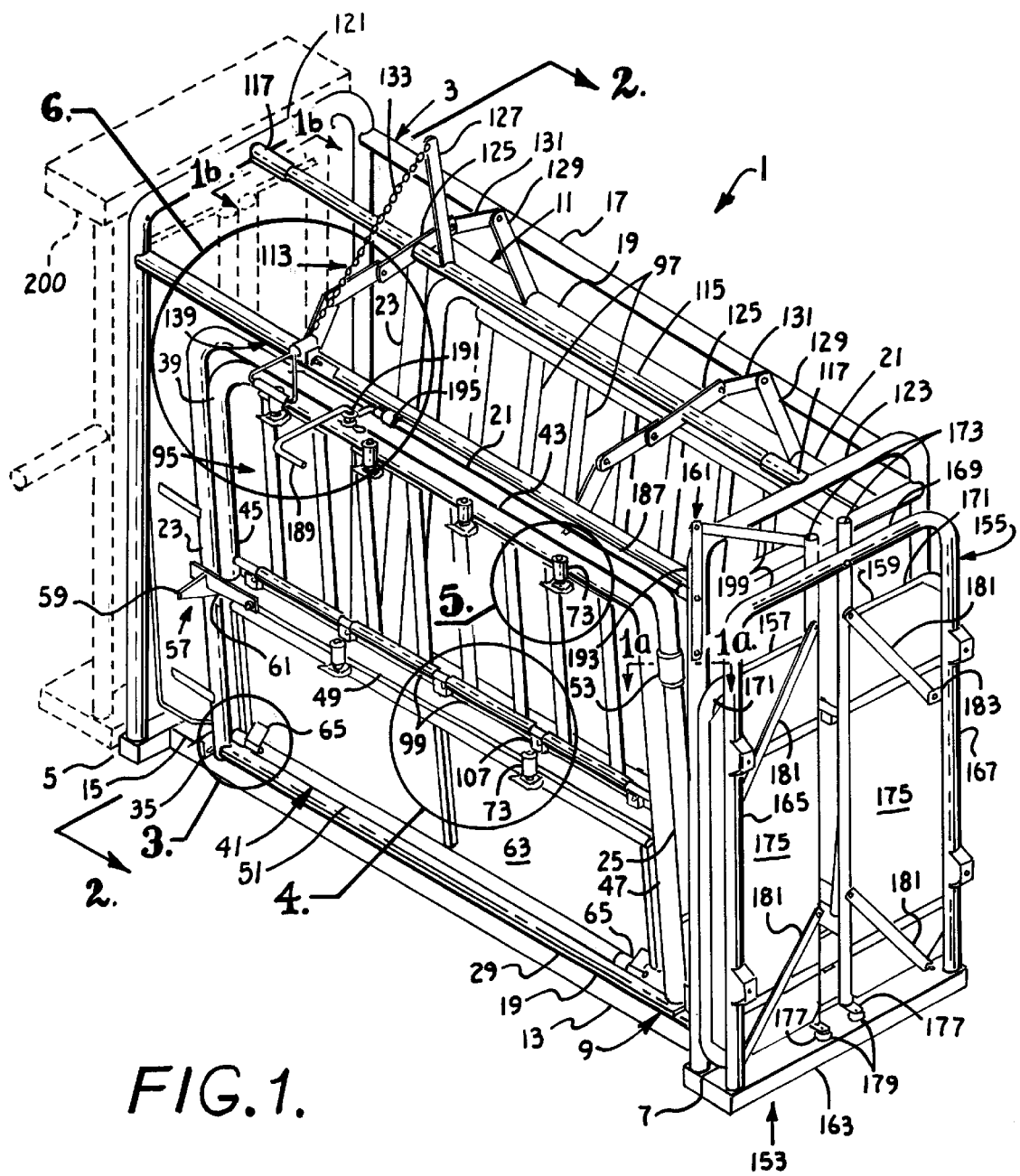
FIG. 1 is a perspective view of a portable squeeze chute apparatus embodying the present invention.
Figure 1A:
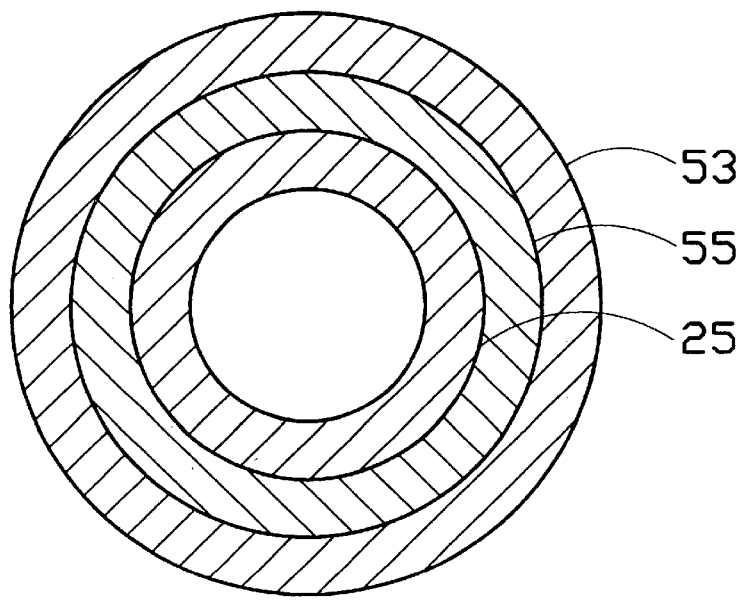
FIG. 1a is an enlarged cross-sectional view of a side exit gate hinge, taken generally along line 1a—1a in FIG. 1, showing the location of a noise reducing sleeve bearing.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a portable squeeze chute apparatus in accordance with the present invention as shown in FIGS. 1 through 6b. The apparatus 1 includes a chute 3 which generally has an exit end 5, an entrance end 7, opposing sidewalls 9 and 11, a base 13 having a floor 15, and a superstructure 17.

Sidewalls 9,11

Each of the opposing sidewalls 9 and 11 includes a frame 19 having a top rail 21, a front upright 23, a rear upright 25, and a generally horizontally oriented bottom rail 29. The bottom rail 29 of each of the sidewalls 9 and 11 is connected to the superstructure 17 such that each of the opposing sidewalls 9 and 11 pivots about an axis provided by a respective pair of generally horizontal stub axles 31. Each of the stub axles 31 passes through an adjusting slot 33 in one of a pair of generally horizontally oriented axle-supporting members 35 such that the bottom rails 29 are spaced above the floor 15 to protect workers standing alongside the apparatus 1 from sideways kicking by the animal 37 positioned in the chute 3. The spacing of the bottom rails 29 above the floor 15 also facilitates cleaning of the floor 15 of the apparatus 1. The spacing between the bottom rails 29 can be adjusted to accommodate animals of varying sizes by relocating the stub axles 31 within the adjusting slots 33 of the axle-supporting members 35.

The sidewalls 9 and 11 include a side exit gate 39. The side exit gate 39 includes a gate frame 41 which fits inside the sidewall frame 19 of the respective sidewall 9 or 11. The gate frame 41 includes a top rail 43, a front upright 45, a rear upright 47, a crossrail 49 and a generally horizontally oriented bottom rail 51. Hinge sleeves 53 are affixed to the rear upright 47 of the gate frame 41 and positioned concentrically about the rear upright 25 of the sidewall frame 19, allowing the gate 39 to pivot about the upright 25. Hinge bearings 55 are placed between the hinge sleeves 53 and the upright 25 for noise reducing purposes. The hinge bearing 55 is constructed of suitable material, such as nylon or polyethylene.

A latch 57 selectively holds the side exit gate 39 securely in its closed position. The latch 57 may include a hook 59 which is affixed to the front upright 23 of the sidewall frame 19, and a latching member 61 which is pivotally connected to the gate frame 41.

Each of the sidewalls 9 and 11 includes a lower panel 63 for accessing lower portions of the animal 37 positioned in the chute 3. Each of the lower panels 63 has a generally planar inner surface to prevent the animal 37 positioned in the chute 3 from using available surface irregularities as a ledge to attempt to climb out of the chute 3.

Figure 3:
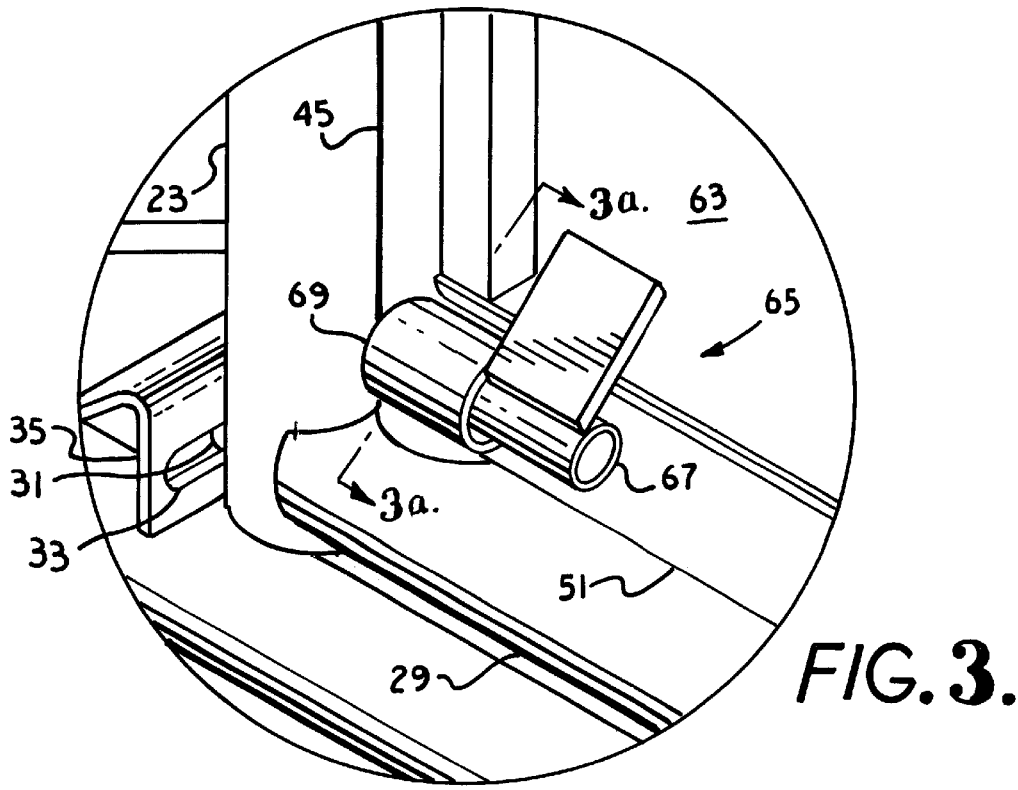
FIG. 3 is an enlarged and fragmentary perspective view of the squeeze chute apparatus showing a hinge for a lower panel.
Figure 3A:
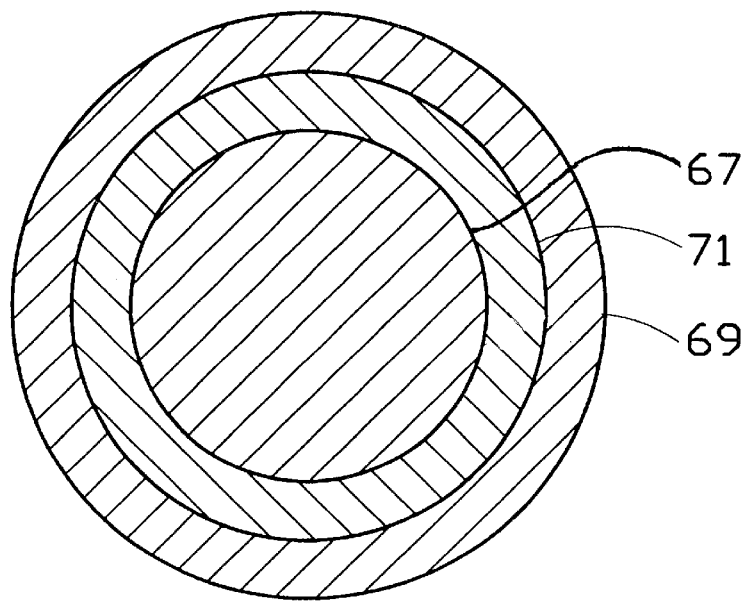
FIG. 3a is an enlarged cross-sectional view of a lower drop panel hinge, taken generally along line 3a—3a in FIG. 3, showing the location of a noise reducing sleeve bearing.

Each of the lower panels 63 is generally connected to the respective side gate bottom rail 51 of the respective side exit gate 39 by a plurality of hinge mounts 65, each having a pivot axle 67 and a hinge sleeve 69, such that each of the lower panels 63 pivots about a respective, generally horizontal axis. Each of the hinge mounts 65 generally includes a hinge sleeve bearing 71 disposed between the respective pivot axle 67 and the respective hinge sleeve 69, as shown in FIG. 3a, such that noise is substantially reduced during operation of the apparatus 1.

Figure 4:
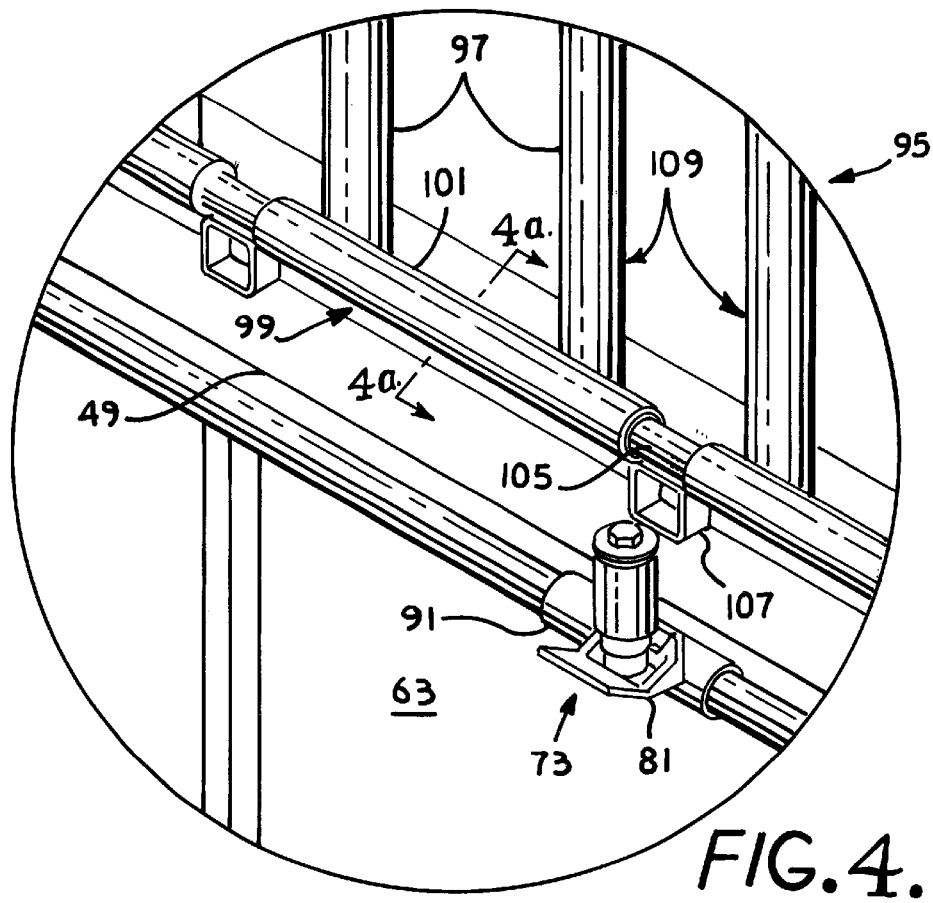
FIG. 4 is an enlarged and fragmentary perspective view of the squeeze chute apparatus showing a latch for a lower panel and a hinge for an upper panel.

At least one latch 73 is adapted to selectively latch the respective lower panel 63 in a closed configuration, as shown in FIG. 4. Each of the latches 73 generally includes a casing 75, a pinion 77, a latch sleeve 79, and an engaging member 81. The latch sleeve 79 is constructed of suitable material, such as nylon or polyethylene, and is disposed between the casing 75 and the pinion 77 for noise reducing purposes. The engaging member 81 is connected to a distal end 83 of the pinion 77.

The pinion 77 is retained within the casing 75 by a bolt 85 and a washer 87. An O-ring 89 is positioned between the washer 87 and the top of the casing 75 for noise reducing purposes. The O-ring 89 is constructed of suitable material, such as nylon or polyethylene For each of the latches 73 for the lower panels 63, the casing 75 is secured to the side gate crossrail 49 of the side exit gate 39. A latch roller 91, constructed of nylon or polyethylene or other suitable material, is rotatably attached to an upper extremity of the lower panel 63. The latch roller 91 facilitates latching of the lower panel 63 and reduces noise during operation of the apparatus 1.

As the lower panel 63 is closed, the engaging member 81 engages the latch roller 91. The bottom surface of the engaging member 81 is tapered such that latching is facilitated by urging the pinion 77 upwardly. The engaging member 81 has an protruding ledge 93 which provides a gripping surface for easily disengaging the latch 73.

Each of the sidewalls 9 and 11 also generally includes an upper panel 95 for accessing upper portions of the animal 37 positioned in the chute 3. Each of the upper panels 95 has a plurality of generally vertically oriented bars 97, which are sufficiently spaced apart such that a worker can reach between the adjacent pairs of the bars 97. Each of the upper panels 95 is connected to the respective side gate crossrail 49 of the respective side exit gate 39 by upper panel hinge mounts 99, such that each of the upper panels 95 pivots about a respective, generally horizontal axis near the lower extremities thereof. The upper panel hinge mounts 99 generally comprise a cylindrically-shaped hinge sleeve 101, a cylindrically-shaped hinge sleeve bearing 103, and a cylindrically-shaped pivot axle 105. The hinge sleeve 101 and pivot axle 105 are generally constructed of steel or other suitable material, and the sleeve bearing 103 is generally constructed of nylon or polyethylene or other suitable material to reduce noise during operation of the apparatus 1. Hinge spacers 107 are generally connected between the crossrail 49 and the pivot axle 105 to provide spacing therebetween and to define locations for the hinge sleeve 101 and the sleeve bearing 103 along the pivot axle 105, as shown in FIG. 4.

For some applications, each of the upper panels 95 may comprise a plurality of sections 109 spaced edge-to-edge along each side of the animal 37 positioned in the chute 3. The sections 109 may have various widths and may include from one of the vertical bars 97 to the number required to make up an upper panel 95. At least one of the latches 73 is connected to the side gate top rail 43 for each of the sections 109 and is adapted to selectively latch the respective section 109 in a closed configuration. Each of the latches 73 for the upper panels 95 generally includes an upper panel latch roller 111, constructed of nylon or polyethylene or other suitable material to facilitate latching the upper panel sections 109 and to reduce noise during operation of the apparatus 1.

Squeezing Mechanism 113

Figure 1B:
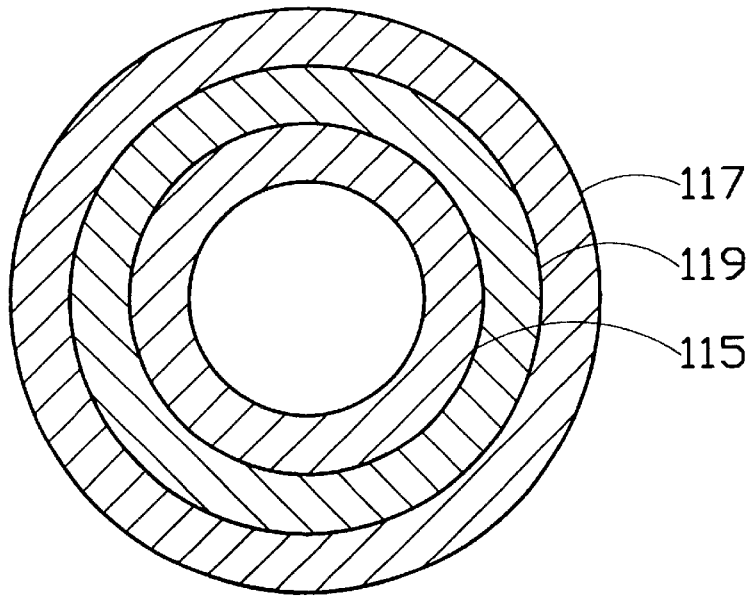
FIG. 1b is an enlarged cross-sectional view of the squeezing mechanism control rod and a socket, taken generally along line 1b—1b in FIG. 1, showing the location of a noise reducing sleeve bearing.
Figure 2:
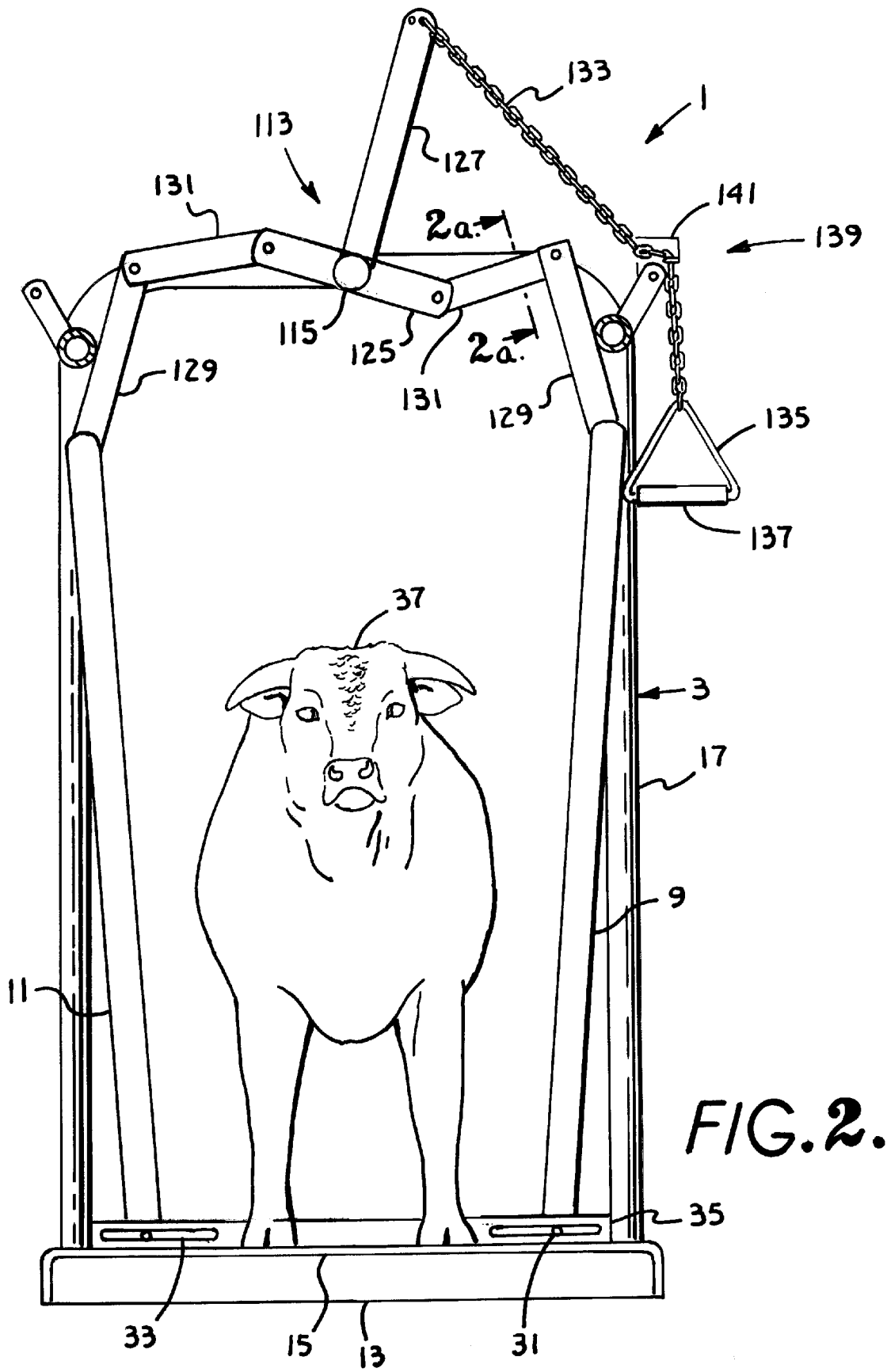
FIG. 2 is a cross-sectional view of the portable squeeze chute taken generally along line 2—2 in FIG. 1.

A squeezing mechanism 113, as shown in FIGS. 1 and 2, interconnects the sidewalls 9 and 11 such that the sidewalls 9 and 11 synchronously pivot about respective axes to selectively allow and prevent lateral movement of the animal 37 positioned in the chute 3. The mechanism 113 includes a control rod 115 rotatably secured in a pair of opposing sockets 117 as shown in FIG. 1. Each of the sockets 117 is fixedly secured to a respective one of a pair of overhead crossbars 121 and 123 of the superstructure 17. Noise reducing sleeve bearings 119, constructed of an appropriate material such as polyethylene, are disposed between the rod 115 and the respective ones of the sockets 117 as shown in FIG. 1b.

Figure 2A:
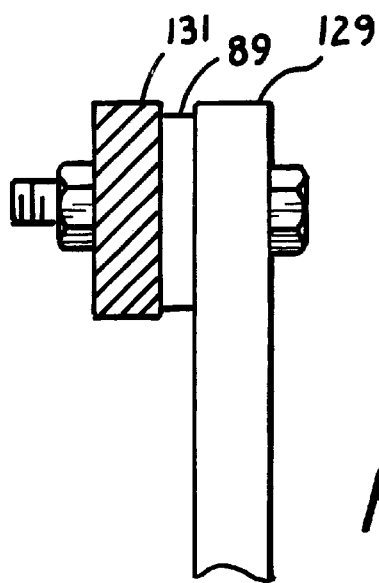
FIG. 2a is an enlarged fragmentary and partially cross-sectional view of a squeezing mechanism link and a sidewall top rail flange, taken generally along line 2a—2a in FIG. 2, showing the location of a noise reducing O-ring.

The squeezing mechanism 113 also includes a pair of elongate linkage flanges 125 and a control flange 127. A pair of sidewall top rail flanges 129 are fixedly secured to each of the sidewall top rails 21 and extend radially outwardly therefrom. The control flange 127 and the linkage flanges 125 are fixedly secured to the rod 115 such that each extends radially outwardly from the rod 115. Links 131 pivotally connect each of the flanges 125 to the sidewall top rail flanges 129, as shown in FIGS. 1 and 2. O-rings 89 are installed for noise reducing purposes between the links 131 and the linkage flanges 125, as well as between the links 131 and the sidewall top rail flanges 129 (FIG. 2a).

One end of a control chain 133 is connected to the control flange 127; the second end of the control chain 133 is equipped with a yoke 135 and a handle 137. By manually applying pressure to the handle 137, the operator causes tension on the control chain 133 and thereby causes the control rod 115 to rotate within the sockets 117. Rotation of the control rod 115 causes the linkage flanges 125 to act upon the sidewall top rail flanges 129 through the links 131 and thereby pulls the top rails 21 of the sidewalls 9 and 11 closer together, restricting the lateral movement of the animal 37 positioned in the chute 3.

A squeeze latch assembly 139 is provided to lock the control chain 133 in place once the sidewalls 9 and 11 are in their desired position, thereby retaining the sidewalls 9 and 11 in said position until the squeeze latch 139 is released by the operator. The squeeze latch assembly 139 includes a squeeze latch lock 141.

The squeeze latch lock 141 includes a tubular portion 143 and a pair of mounting flanges 145 which are fixedly secured to the tubular portion 143. The tubular portion 143 has a Y-shaped notch 147 cut into its lower lip. The mounting flanges 145 are pivotally mounted to the superstructure 17 of the chute 3 in such a manner that the tubular portion 143 is perpendicular to the longitudinal axis of the chute 3 and in alignment with the control flange 127 of the squeezing mechanism 113. The control chain 133 passes through the tubular portion 143 of the squeeze latch lock 141.

Because of its pivotal mounting, the squeeze latch lock 141 is free to rotate up and down, matching the tilt of the tubular portion 143 to the angle of the control chain 133, and allowing the control chain 133 to travel freely through the tubular portion 143. By pulling the handle 137 downwardly and inwardly, the operator can cause a link of the control chain 133 to engage the notch 147 and thereby lock the sidewalls 9 and 11 in position. To release the control chain 133, the operator need only pull the handle 137 downwardly and outwardly.

Figure 6:
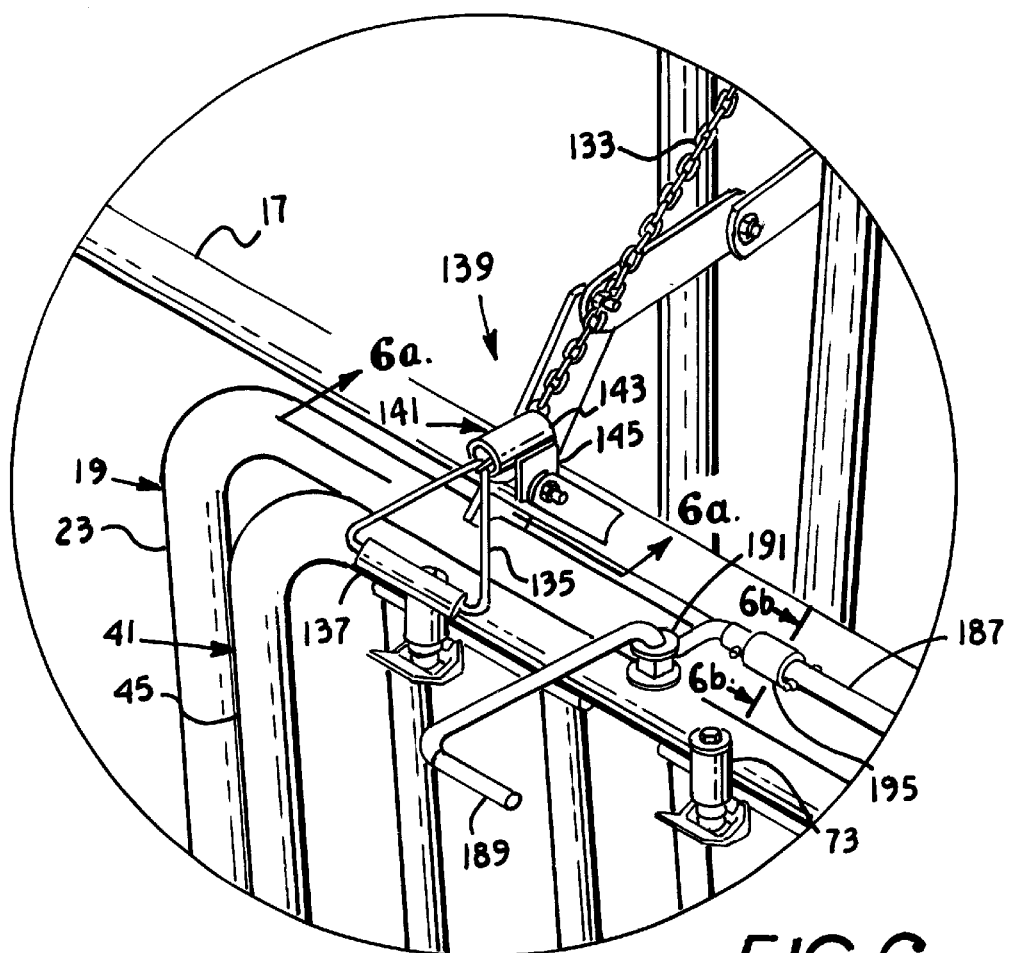
FIG. 6 is an enlarged and fragmentary perspective view of the squeeze chute apparatus showing the squeeze latch assembly.
Figure 6A:
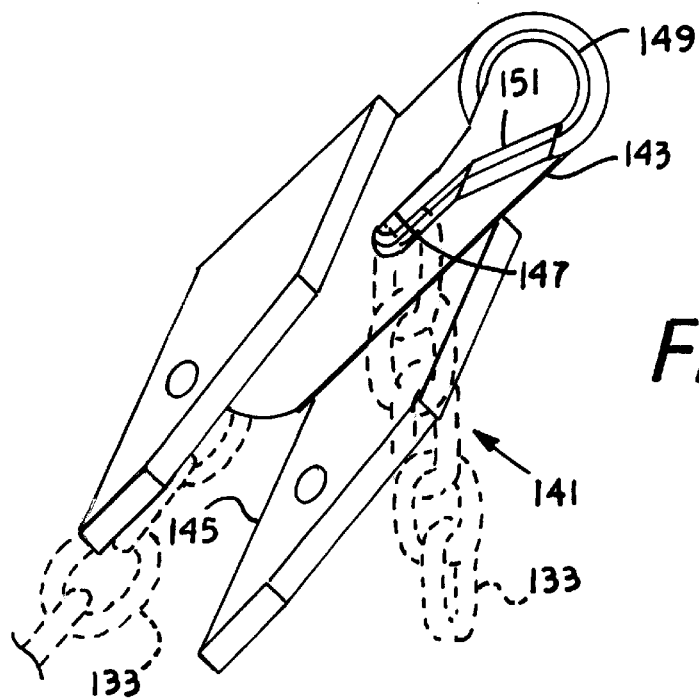
FIG. 6a is a perspective view of the squeeze latch lock, as seen from the underside, showing the control chain capturing notch and noise reducing lining.
Figure 6B:
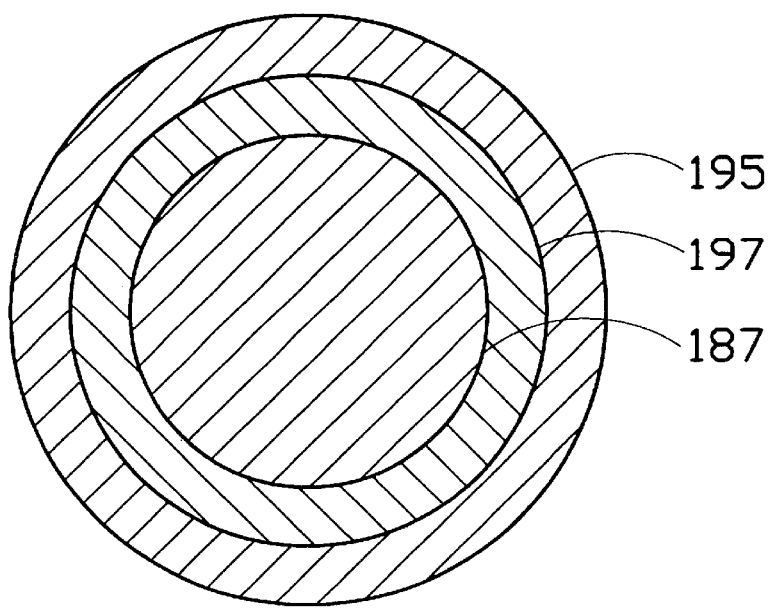
FIG. 6b is an enlarged cross-sectional view of the tailgate control rod and a mounting sleeve, taken generally along line 6b—6b in FIG. 6, showing the location of a noise reducing sleeve bearing.

The squeeze latch assembly 139 also includes a noise reducing lining 149 FIG. 6a). The lining 149 prevents metal-to-metal contact between the control chain 133 and the inner surface of the tubular portion 143. The lining 149 consists of a tubular member, which may be made of nylon, polyethylene or other suitable material, which is affixed concentrically within the tubular portion of the squeeze latch lock 141. The lining 149 has a Y-shaped notch 151 matching the Y-shaped notch 147 of the tubular portion 143 of the squeeze latch lock 141.

Tailgate Assembly 153

A tailgate assembly 153 (FIGS. 7 and 8) is connected to the entrance end 7 of the chute 3 to selectively admit livestock to the chute 3 and to prevent said livestock from backing out of the chute 3 once admitted thereto. The tailgate assembly 153 generally comprises a frame 155, door sections 157 and 159, and a control mechanism 161. The tailgate frame 155 has a base 163, upright side rails 165 and 167, and a generally horizontal top rail 169. Door sections 157 and 159 have door frames 171 with upright inner rails 173, and generally planar door panels 175. The tailgate assembly 153 is moveable between a closed position (FIG. 7) and an open position (FIG. 8).

The door sections 157 and 159 each include a door stop 177. The door stops 177 are positioned to make contact with the respective tailgate frame side rails 165 and 167 when the door sections 157 and 159 are in their fully open position. Each door stop 177 includes a bumper 179 which is made of a sound deadening material such as rubber, neoprene, or other suitable material, and is designed to reduce noise by cushioning the impact between the door stops 177 and the tailgate frame side rails 165 and 167.

Each of the door sections 157 and 159 are connected to the tailgate frame 155 by means of a pair of parallel links 181. The links 181 have first ends which are pivotally connected to the respective upright inner rail 173 of the door section 157 or 159 and second ends which are pivotally connected to mounting flanges 183 on the tailgate frame 155.

A pair of noise reducing bumper stops 185 are positioned between each door section 157 and 159 and the respective tailgate frame side rail 165 or 167. The bumper stops 185 are fixedly secured to the side rails 165 and 167 to prevent the door sections 157 and 159 from impacting the tailgate frame 155. The bumper stops 185 can be made of rubber, neoprene or other suitable energy absorbing material.

The tailgate control mechanism 161 (FIG. 1)includes a control rod 187 which has a handle 189 which extends radially outwardly therefrom. The handle 189 may include a pivot joint 191 which allows the handle 189 to be folded out of the way when not in use. The control rod 187 also includes an elongate linkage flange 193 which is fixedly secured to the control rod 187 such that each extends radially outwardly from the control rod 187. The control rod 187 is rotatably mounted to the superstructure 17 of the chute 3 by means of control rod sleeves 195. A control rod sleeve bearing 197 is located between each control rod sleeve 195 and the control rod 187 for noise reduction purposes. The control rod sleeve bearing is constructed of nylon or polyethylene or other suitable material.

The tailgate control mechanism also includes a pair of links 199 (FIGS. 7 and 8). Each of the links 199 connects the elongate linkage flange 193 to an upper extremity of a respective door frame inner rail 173. As the control rod 187 is rotated by means of the handle 189, the door sections 157 and 159 pivot on the parallel links 181 and are moved upwardly and outwardly to their open position.

Headgate Assembly 200

The exit end 5 of the chute 3 is adapted for the mounting of a headgate assembly 200 having a neck clamp which is adapted to selectively abut opposing sides of the neck of the animal 37 as it is positioned in the chute 3, and thereby selectively control the fore-and-aft movement of the animal 37. Headgate assemblies of various types are well known in the livestock equipment industry, and many different designs are commercially available. The headgate assembly 200 can be any one of these known, preexisting, or commercially available headgates.

Noise Reduction System 201

The squeeze chute apparatus 1 includes a noise reduction system 201, which includes a sleeve-pivot subsystem 203 for suppressing noise at various pivotal connections between chute components.

More specifically, the rod 115 and the sockets 117 of the squeezing mechanism 113 are separated by noise-reducing sleeve bearings 119 (FIG. 1b). The sleeve bearings 119 can comprise a suitable material for reducing noise and friction, such as polyethylene, nylon, or any other suitable material.

Figure 4A:
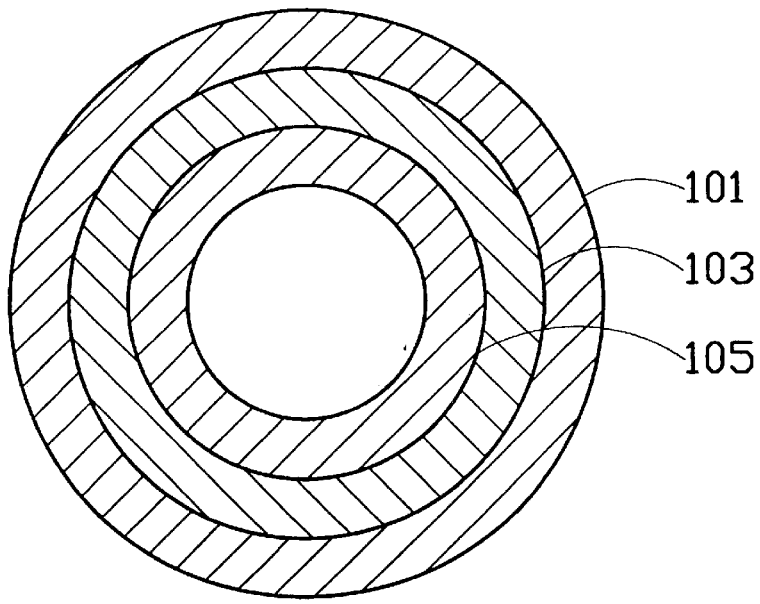
FIG. 4a is an enlarged cross-sectional view of an upper drop panel hinge, taken generally along line 4a—4a in FIG. 4, showing the location of a noise reducing sleeve bearing.

The sleeve-pivot subsystem 203 is also located at the pivotal connections between the upper drop panel 95 and the side gate crossrail 49 of the respective side exit gate 39, as shown in FIG. 4a. Such pivotal connections include pivot axles 105 which are mounted on the crossrails 49 by spacers 107. Outer, metal hinge sleeves 101 extend between respective pairs of spacers 107, and hinge sleeve bearings 103 are positioned between the outer metal hinge sleeves 101 and the axles 105 for permitting relatively quiet and low-friction rotation therebetween. The sleeve bearings 103 can comprise polyethylene, nylon or some other suitable material, and can extend coextensively with the metal hinge sleeves 101 between respective pairs of spacers 107.

As noted above, the lower drop panels 63 are pivotally connected to respective side gate bottom rails 51 of the respective side exit gate 39 by hinge mounts 65, each having a pivot axle 67 and a hinge sleeve 69, such that each of the lower drop panels 63 pivots about a respective, generally horizontal axis. Hinge sleeve bearings 71, which can comprise polyethylene, nylon, or other suitable material, are located between respective pivot axles 67 and hinge sleeves 69, as shown in FIG. 3a.

The sleeve-pivot subsystem 203 is also employed at the pivotal connections of the tailgate control mechanism 161. Noise reducing sleeve bearings 197 are used to separate the tailgate control rod 187 from the control rod sleeves 195. Use of the sleeve bearings 197 prevents metal-to-metal contact between the control rod 187 and the sleeve 195, thereby reducing friction and diminishing the noise which would likely occur if the tailgate control mechanism 161 were operated without the sleeve bearings 197 in place.

The sleeve-pivot subsystem 203 is also used on the side exit gates 39 where bearing sleeves 55 are disposed between hinge sleeves 53 and the rear uprights 25 of the sidewall frames 19.

Figure 5:
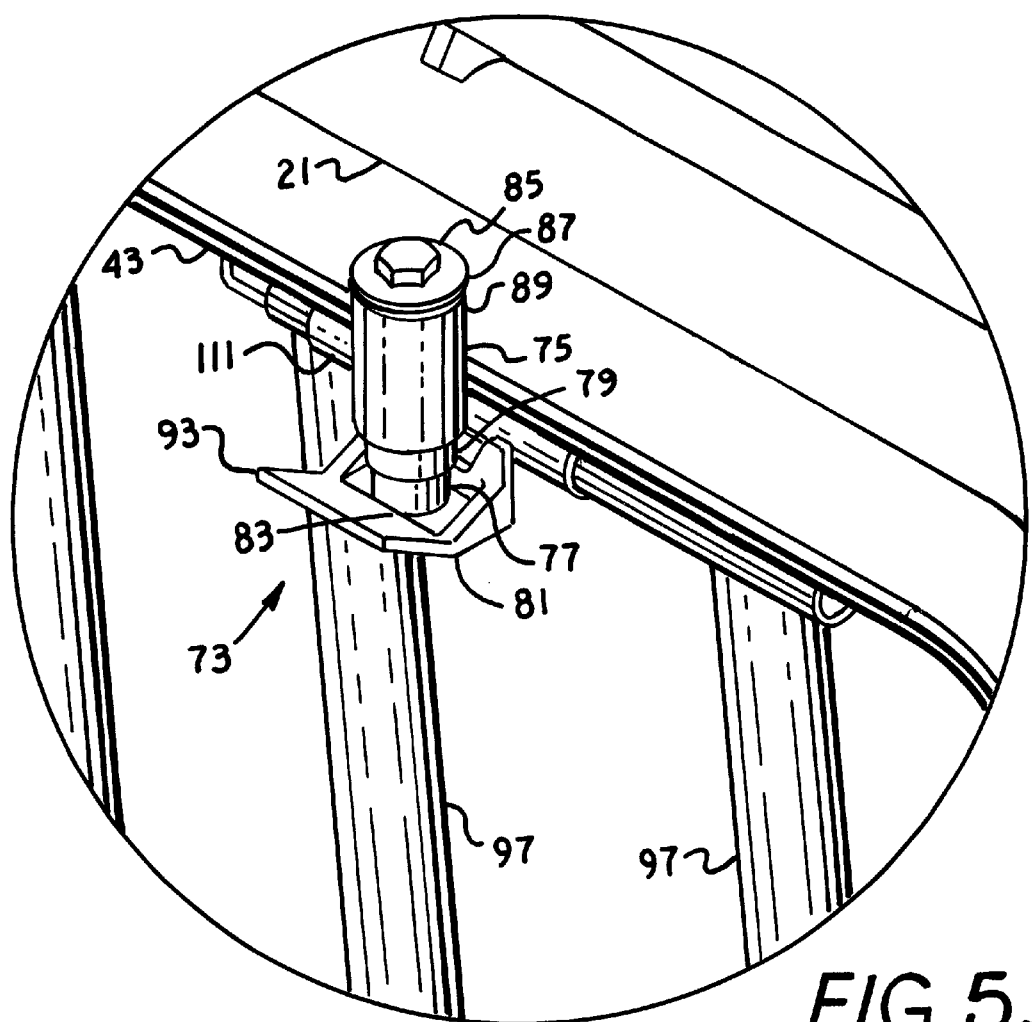
FIG. 5 is an enlarged and fragmentary perspective view of the squeeze chute apparatus showing a latch for a upper panel.

A second noise reduction subsystem 205 comprises a plurality of captured latch roller assemblies 91 and 111, each located at a respective drop panel 63 or 95. As shown in FIGS. 4 and 5, each captured latch roller assembly 91 or 111 is captured between a respective latch assembly 73 and the side exit gate frame 41, and the upper ends of the drop panels 63 and 95 are thus restrained. The inclusion of the plastic latch roller assemblies 91 and 111 prevents metal-to-metal contact in these locations and noise caused by the closing of the upper panels 95 and the lower panels 63 is thus suppressed. Moreover, with the panels 63 and 95 in their closed positions, the latch rollers 91 and 111 function to suppress chatter at the secured upper ends of the panels 63 and 95. If not silenced in this manner, such connections could be a considerable source of noise or chatter, i.e., as the animal 37 in the chute 3 moves about and as the sidewalls 9 and 11 are manipulated.

The noise reduction system 201 further includes a latch sleeve subsystem 207 which comprises multiple latch sleeves 79, each located within a respective latch casing 75 and receiving a respective latch pinion 77 which is axially slidable therein along a generally vertical axis. The latches 73 are thus considerably quieter in operation because metal-to-metal contact is avoided by the interposing latch sleeves 79 so that latching and unlatching procedures involve metal-to-plastic contact only, which can be relatively quiet. Moreover, the latch sleeves 79 also cushion the latch casing 75 and pinions 77 from contact when subjected to lateral forces, for example forces which are transmitted through the drop panels 63 and 95 and into the latch assemblies 73. Absent such latch sleeves 79, the noise level associated with such lateral forces could be considerable.

Still further, the noise reduction system 201 includes a noise reducing squeeze latch subsystem 152. A sleeve or lining 149, which may be made of nylon, polyethylene, or other suitable material, is disposed within the tubular portion 143 of the squeeze latch lock 141. The lining 149 prevents metal to metal contact between the control chain 133 and the inner surface of the tubular portion 143 as the control chain 133 is pulled through the tubular portion during operation of the squeezing mechanism 113.

The noise reduction system 201 also includes an O-ring subsystem 209 comprising a plurality of O-rings 89 mounted on top of each respective latch pinion 77 by a bolt 85 threadably received by the respective pinion 77 and clamping the O-ring 89 in place by means of a washer 87. The O-ring subsystem 209 suppresses noise as the latches 73 open and close by cushioning the tops of the casings 75 and the respective pinions 77. Moreover, the O-rings 89 tend to suppress chatter which might otherwise be caused by relative movement between the washer 87, casing 75, and pinion 77 of each latch 73.

O-rings 89 are also employed for noise reducing purposes at pivotal connections in the various operating linkages of the squeeze chute apparatus 1. For example, O-rings 89 are used in the squeezing mechanism 113 to separate the links 131 from the linkage flanges 125 and the sidewall top rail flanges 129. O-rings 89 may be used in the tailgate control mechanism 161 between the linkage flange 193 and the links 199, as well as between the links 199 and the door frame inner rails 173. Similarly, O-rings 89 may be disposed between the parallel links 181, the door frame inner rails 173, and the mounting flanges 183.

Lastly, the noise reducing system 201 includes a bumper stop subsystem 211, which involves placing bumper stops made of a suitable energy absorbing material such as rubber or neoprene between metal parts to prevent them from impacting each other and producing noise. The bumper stop subsystem 211 is generally employed between the door sections 157 and 159 and the tailgate frame 155 to prevent the door sections 157 and 159 from colliding with the tailgate frame 155.

Noise reducing bumper stops 185 are positioned between the door sections 157 and 159 and the respective tailgate frame side rail 165 or 167 to prevent the metal parts from impacting each other when the tailgate assembly 153 is operated, or when the animal 37 positioned in the chute 3 jars the door sections 157 and 159. Similarly, door stop bumpers 179 are attached to the door stops 177 of the door sections 157 and 159 to prevent the metal door stops 177 from impacting the tailgate frame side rail 165 and 167 when the door sections 157 and 159 reach their fully open positions.

The cumulative effect of the noise reduction system 201 is to considerably suppress the operating noise, which can range from relatively low-amplitude background noise to relatively loud impact noises in chutes which are not equipped with such noise reduction systems. Stress on animals and operators alike can be decreased by reducing operating noises of all types. Even the relatively low-amplitude background noises or "chatter" can contribute to stress, fatigue and the like. The sudden, high amplitude noises, such a those that might occur when the drop panels 63, 95 are slammed shut, can startle the animals and significantly increase their anxiety. Moreover, as frightened animals tend to struggle, they can further contribute to the noise levels by shaking the entire chute and exacerbate the stress-related problems which can accompany a squeeze chute lacking such a noise reduction system.

The noise reduction system is particularly important for livestock handling systems which are typically constructed with a certain amount of play, or with relatively loose tolerances at their connections. Such tolerances tend to reduce manufacturing costs and also tend to make such units better adapted for operation under the types of adverse conditions which they are likely to encounter in the field. Although a portable squeeze chute apparatus embodying and employing the present invention would be feasible with relatively tight tolerances and might even be preferable in some respects, the noise reduction system 201 is particularly well adapted for applications involving relatively loose tolerances which can withstand the relatively severe and adverse operating conditions which can often be encountered in livestock handling operations.

Collectively, the use of noise-abating tubing, O-rings, and bumper stops as described above and as depicted herein can be employed at approximately seventy locations for avoiding metal-to-metal contact thereat and suppressing noise. These locations include: the side exit gate hinge bearings 55; the lower panel hinge mount sleeve bearings 71; the panel latch sleeves 79; the panel latch O-rings 89; the lower panel latch rollers 91; the upper panel hinge sleeve bearings 103; the upper panel latch rollers 111, the squeezing mechanism socket sleeve bearings 119; the squeezing mechanism O-rings 89; the squeeze latch lock lining 149; the tailgate door stop bumpers 179; the tailgate bumper stops 185; and the tailgate control rod sleeve bearings 197. More or fewer such connections could be equipped with such plastic sleeves and O-rings in chutes with different configurations embodying the present invention.

The portable squeeze chute apparatus of the present invention is adaptable for use with animals of various sizes, including but not limited to bovine, equine, swine, and other livestock.

It is understood that while certain forms of the present invention have been illustrated and described herein, it is not to be limited to the specific forms or arrangement of parts described and shown.

What is claimed is:

1. A livestock working apparatus, including:
    a) a chute having a pair of opposing sidewalls, an entrance end, an exit end, a base, and a superstructure mounted on said base and extending upwardly therefrom, said sidewalls being connected to said base; and
    b) a tailgate having a frame mounted on said superstructure at said chute entrance end, said tailgate further including a pair of door sections mounted on said tailgate frame and moveable toward and away from one another between an open position adapted for admitting an animal to said chute and a closed position closing said chute entrance end, each of said door sections having a door stop with a noise reducing bumper connected thereto and adapted for engaging said tailgate frame when said door sections are in the open position.

2. The livestock working apparatus of claim 1, which includes a tailgate control mechanism for manually opening and closing said tailgate door sections, said tailgate control mechanism comprising:

a) a control rod having first and second ends, said control rod being rotatably mounted on said superstructure and being longitudinally oriented with respect to said chute;

b) a handle connected to said first end of said control rod and extending radially outwardly therefrom;

c) an elongate linkage flange connected to said control rod second end and having opposed ends spaced outwardly from said control rod; and d) a pair of links, each of which connects one of said ends of said elongate flange to a respective one of said tailgate door sections.

3. The livestock working apparatus of claim 2, wherein said tailgate control mechanism further includes:

a) a control rod sleeve fixedly secured to said chute superstructure and rotatably receiving said control rod; and b) a noise reducing bearing sleeve disposed between said control rod sleeve and said control rod.

4. A livestock working apparatus as in claim 2, wherein said handle is pivotally connected to said control rod.

5. The livestock working apparatus of claim 1, wherein said tailgate includes a pair of noise reducing bumper stops mounted on said tailgate frame, each of said bumper stops being disposed between said tailgate frame and a respective one of said door sections so as to prevent contact therebetween as said door sections move between said open and closed positions.

6. A livestock working apparatus as in claim 1, wherein each of said doors stop is connected to a lower end of the respective door section and extends rearwardly therefrom.

7. A livestock working apparatus, including:

a) a chute having a pair of opposing sidewalls, an entrance end, an exit end, a base, and a superstructure mounted on said base and extending upwardly therefrom, said sidewalls being connected to said base and having respective top rails;

b) a tailgate connected to the entrance end of said chute for selectively admitting an animal to the entrance end of said chute;

c) a headgate connected to the exit end of said chute, said headgate being adapted to control fore-and-aft movement of said animal; and d) a squeezing mechanism adapting for pivoting one of said opposing sidewalls between an open position and a constricting position, said squeezing mechanism including:

i) a control rod with first and second ends rotatably connected to said superstructure in proximity to said entrance and exit ends respectively, said control rod extending generally longitudinally with respect to said chute;

ii) an elongate linkage flange fixedly secured to the control rod and extending radially outwardly therefrom;

iii) a sidewall top rail flange fixedly secured to the top rail of said one sidewall and extending radially outwardly therefrom;

iv) a link pivotally connecting the linkage flange to the sidewall top rail flange;

v) a control flange fixedly secured to the control rod and extending radially outwardly therefrom;

vi) a control chain for operating said sidewall squeezing mechanism, said control chain being connected to said control flange; and vii) a squeeze latch lock connected to said superstructure, said squeeze latch lock including a tubular portion having a lower lip with a notch, said control chain passing through said tubular portion and selectively engaging said notch.

8. A livestock working apparatus as in claim 7, wherein said squeeze latch lock further includes a noise reducing lining interposed between said tubular portion and said control chain.

9. A livestock working apparatus as in claim 7 which includes noise reducing O-rings disposed between the link and the linkage flange and between the link and the sidewall top rail flange.

10. A livestock working apparatus as in claim 7 wherein said squeezing mechanism interconnects the sidewalls such that the sidewalls synchronously pivot about respective axes.

11. A livestock working apparatus as in claim 7 which includes:

a) first and second sockets connected to said superstructure, each said socket having a receiver, said first and second socket receivers rotatably accepting said first and second control rod ends respectively; and b) noise reducing bearing sleeves disposed between said control rod ends and said socket receivers.

12. A livestock working apparatus as in claim 7, wherein each of said sidewalls includes a crossrail and an upper access panel pivotally connected to said crossrail by at least one hinge mount having a pivot axle, a hinge sleeve, and a noise reducing hinge sleeve bearing disposed between said pivot axle and said hinge sleeve.

13. A livestock working apparatus as in claim 12, which includes a latch adapted for selectively retaining said upper access panel in a closed position and including:

a) a tubular casing secured to said sidewall top rail;

b) a pinion having an upper end and a lower end, said pinion being slidably mounted within said casing and said lower end selectively engaging said upper access panel; and c) a noise reducing latch sleeve disposed between said pinion and said casing.

14. A livestock working apparatus as in claim 13, wherein the upper end of said pinion has a threaded receiver and said latch further includes:

a) an axial fastener and a washer, said axial fastener passing through said washer and threadibly engaging said threaded receiver, thereby retaining said pinion in said casing; and b) a noise reducing O-ring disposed between said washer and said casing.

15. A livestock working apparatus as in claim 14, which includes an engaging member fixedly secured to the lower end of said pinion and having a sloping lower surface, a generally vertical engaging surface, and a protruding ledge.

16. A livestock working apparatus as in claim 15 which includes a noise reducing latch roller which is captured between said engaging surface of said engaging member and said upper access panel when said panel is in the closed position.

17. A livestock working apparatus as in claim 12, wherein each said upper access panel is comprised of a plurality of sections.

18. A livestock working apparatus as in claim 12, wherein each said sidewall further includes a bottom rail, a lower access panel and a hinge mount, said lower access panel pivotally connected to said bottom rail by said hinge mount, said hinge mount having a pivot axle, a hinge sleeve connected to one of said bottom rail and said lower access panel, and a noise reducing hinge sleeve bearing disposed between said pivot axle and said hinge sleeve.

19. A livestock working apparatus as in claim 18, which includes a latch adapted for selectively retaining said lower access panel in a closed position and including:
   a) a tubular casing secured to said sidewall crossrail;
   b) a pinion having an upper end and a lower end, said pinion being slidably mounted within said casing and said lower end selectively engaging said lower access panel; and
   c) a noise reducing latch sleeve disposed between said pinion and said casing.

20. A livestock working apparatus as in claim 19, wherein the upper end of said pinion has a threaded receiver and said latch further includes:
   a) an axial fastener and a washer, said axial fastener passing through said washer and threadibly engaging said threaded receiver, thereby retaining said pinion in said casing; and
   b) a noise reducing O-ring disposed between said washer and said casing.

21. A livestock working apparatus as in claim 20, which includes an engaging member fixedly secured to the lower end of said pinion and having a sloping lower surface, a generally vertical engaging surface, and a protruding ledge.

22. A livestock working apparatus as in claim 21 which includes a noise reducing latch roller which is captured between said engaging surface of said engaging member and said lower access panel when said panel is in the closed position.

23. A livestock working apparatus as in claim 7, wherein at least one of said opposing sidewalls includes a side exit gate.

24. A livestock working apparatus as in claim 23, wherein said sidewall includes a rear upright and a hinge mount and wherein said side exit gate is hingedly connected to said rear upright by said hinge mount, said hinge mount including:
   a) a hinge sleeve fixedly secured to said side exit gate and encircling said sidewall rear upright; and
   b) a noise reducing bearing sleeve disposed between said hinge sleeve and said sidewall rear upright.

25. In a livestock working apparatus including a chute and a chain connected to the chute, the chain being selectively tensioned to aid in restraining an animal within the chute, a chain lock comprising:
   a) a tubular body having first and second ends, said second end including a notch; and
   b) a mounting flange connected to said tubular body and extending outwardly therefrom, said mounting flange being pivotably connected to the chute; wherein
   c) the chain passes through said tubular body from said first end to said second end and is selectively engageable with said notch to retain the chain in a selected position.

26. A chain lock as in claim 25 and further including a noise reducing lining positioned within said tubular body so as to be interposed between said tubular body and said chain.

27. A chain lock as in claim 25, wherein said notch is generally Y-shaped.

28. A livestock working apparatus, including:
   a) a chute having a pair of opposing sidewalls, at least one of said sidewalls being pivotally mounted for movement between an open position and a constricting position;
   b) a control chain connected to said at least one sidewall such that applying tension to said chain urges said at least one sidewall toward said constricting position; and
   c) a squeeze latch lock connected to said chute, said squeeze latch lock including a tubular portion having a lower lip with a notch, said control chain passing through said tubular portion and selectively engaging said notch.

29. A livestock working apparatus as in claim 28, wherein said squeeze latch lock further includes a noise reducing lining interposed between said tubular portion and said control chain.

30. A livestock working apparatus as in claim 28, wherein said squeeze latch lock is pivotally connected to said chute.

31. A livestock working apparatus as in claim 28, wherein said control chain is connected to both of said sidewalls such that said sidewalls synchronously pivot about respective axes upon actuation of said control chain.

* * * * *